Patented Sept. 13, 1949

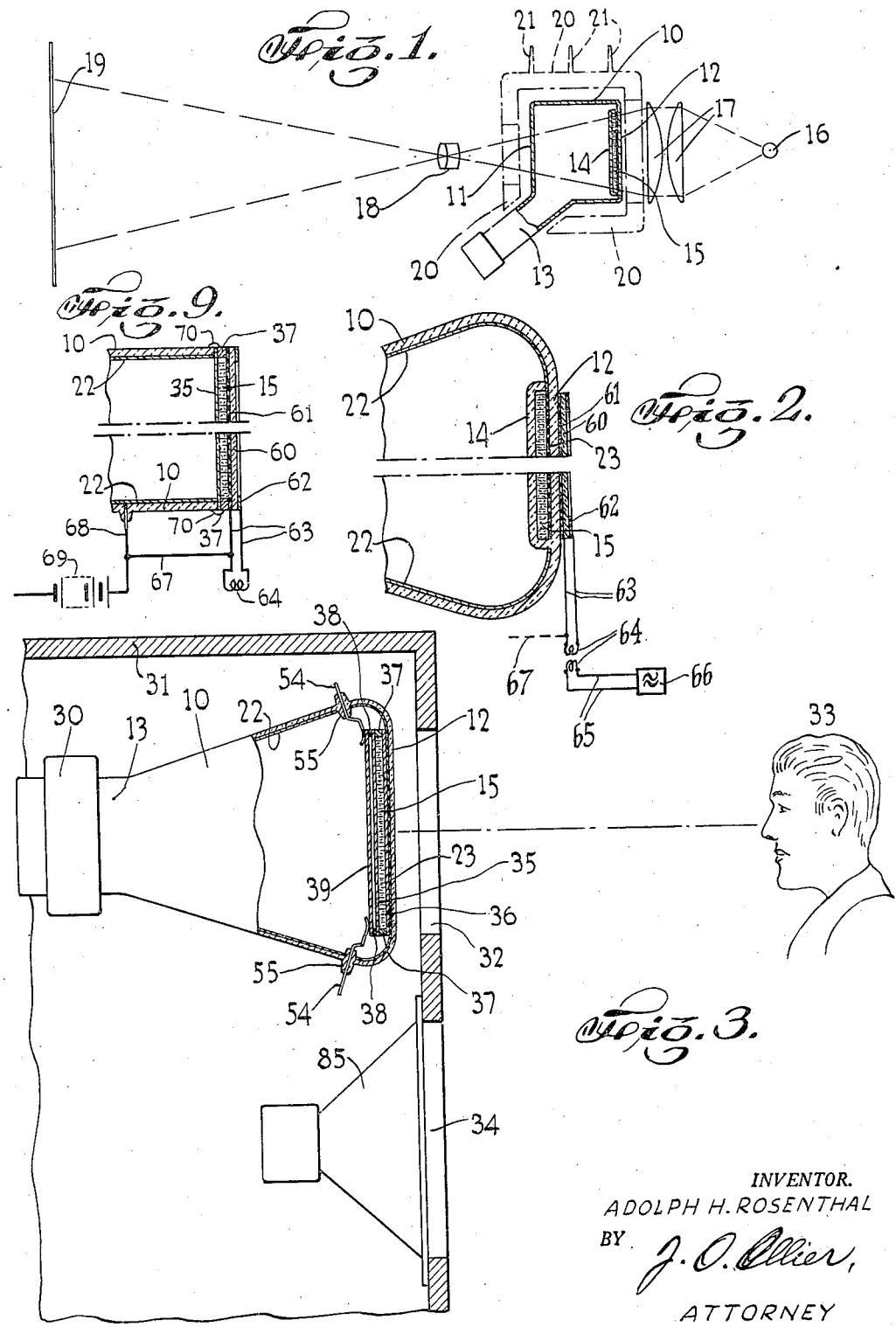

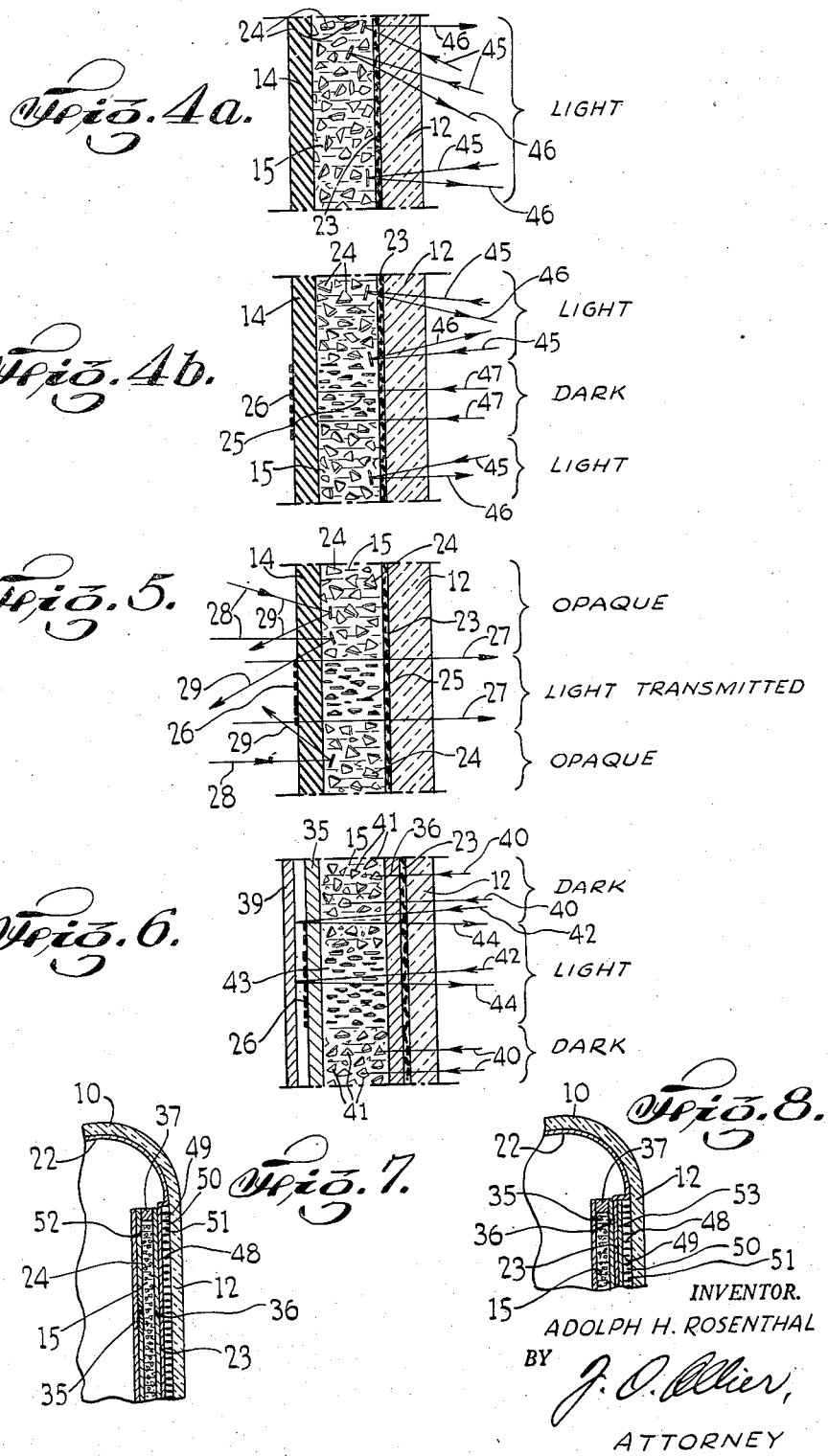

2,481,621

UNITED STATES PATENT OFFICE 2,481,621

LIGHT MODULATION BY CATHODE-RAY ORIENTATION OF LIQUID - SUSPENDED PARTICLES

Adolph H. Rosenthal, New York, N. Y., assignor, by mesne assignments, to Skiatron Corporation, New York, N. Y., a corporation of New York Application May 2, 1945, Serial No. 591,498

7 Claims. (Cl. 178—75)

This invention relates to apparatus for visibly reproducing electric signals representative of intelligence impressed upon an electron stream, and in particular to television receivers and reproducers.

The invention comprises apparatus for visibly reproducing signals, and in particular television projection receivers in which an electron stream or beam upon which the signals are impressed, changes the optical qualities of the impinged screen which can be viewed directly or used as a light valve.

This application is a continuation in part of my copending patent application Ser. No. 560,776, filed October 28, 1944, now Patent 2,472,988.

It is an object of this invention to provide a reproducer of the type herein concerned with a suspension type screen which can be used either as a light valve or as a direct view screen in diffuse day or room light, or artificial light.

It is another object of the invention to provide reproducers of the type herein concerned with a suspension type screen which can be observed without darkening the room in which the reproducer is operated, and more specifically to utilize diffuse light outdoors or indoors and which may be day light or artificial light, for making visible, or for increasing the visibility of signals reproduced in suspension type screens.

It is a further object of the invention to increase the contrast effects in suspension type screens which are directly viewed upon illumination by day or artificial light.

These and other objects of the invention will be more clearly understood when the specification proceeds with reference to the drawings in which rather schematically Fig. 1 shows in vertical cross section, with parts in elevation, an arrangement of a cathode ray tube provided with a suspension screen according to the invention, for projecting or imaging the information represented in that screen upon a preferably larger viewing or projecting screen, Fig. 2 a cross section on enlarged scale through the front end of the tube shown in Fig. 1 and the screen provided with means for deorienting the suspended particles, Fig. 3 a vertical cross section, with parts in elevation, through a cabinet and cathode ray tube therein provided with a suspension screen and an improvement according to the invention for converting it into a direct-view screen, Figs. 4a and 4b at enlarged scale cross sections through a portion of a suspension screen provided with an improvement according to the invention for converting it into a direct-view screen, illustrating its operation, Figs. 5 and 6 similarly cross sections through a portion of a suspension screen according to the invention, illustrating its operation as a light valve (Fig. 5) and as a direct-view screen (Fig. 6), Figs. 7 and 8 a cross section through a front portion of a cathode ray tube for color-reproduction of received signals by means of a direct-view suspension screen (Fig. 7) or light valve suspension screen (Fig. 8), and Fig. 9 in cross section the front portion of a tube provided with deorientation means.

Referring to Fig. 1, a cathode ray tube is shown comprising an evacuated glass envelope 10 having parallel opposite front walls or windows 11, 12 and a neck 13 in which the electron gun, including focusing, accelerating, deflecting and modulating electrodes, is arranged in well known manner and therefore not shown. A suspension screen is provided inside front wall 12 by means of a transparent container wall 14 slightly spaced from wall 12. A transparent liquid, such as oil of suitable dielectric constant, is filled into the space between those walls, and minute disk or flakelike particles preferably of colloidal size are suspended therein. Light from a light source 16 is projected through condenser lens system 17 upon and through the suspension 15 and is focused by lens system 18 upon a projection or viewing screen 19. A cooling jacket 20 of metal preferably blackened on its inside or of other suitable heat rays absorbing material surrounds a proper part of tube 10. The jacket is preferably hollow and a desired cooling medium, such as water can be passed therethrough. Jacket 20 can be provided with cooling fins 21, if so desired. The accelerating electrode within neck 13 is continued in known manner by an electrically conductive coating 22, Fig. 2, to the front wall 12 of glass envelope 10, and connected with a substantially transparent conductive layer 23, for instance of evaporated or sputtered metal, such as platinum, or a suitable oxide inside and on wall 12. Instead, a transparent film electrode can be provided on the outside of wall 12 and a high, constant or adjustable positive potential the same or exceeding that of coating 22 applied thereto.

Walls 12, 14 with suspension or dispersion medium 15 and minute flat particles suspended or dispersed therein form what is known as a "suspension screen." It has been suggested to use flaky graphite particles which are light absorbing or disc-like particles stamped out of aluminum foil. According to one feature of the invention, light intercepting particles of rod-or plate-like or elongated shape and high light reflecting power are used consisting for instance of metal or alloy the surfaces of which are treated to reflect or scatter rather than absorb incident light. Wall 14 may be of any suitable insulating, transparent material such as glass, thin mica or a plastic.

Assume that the suspended particles are electrically conductive or that their dielectric constant is larger than that of the suspension medium, and that they are ordinarily oriented at random within that medium. In such case an electron beam impinging upon a selected or elemental area of the exposed outside of wall 14 will charge this area to a potential different from the constant potential of electrode 23 and corresponding to the intensity of the beam; the electric field produced thereby across the suspension layer orients the suspended particles in close proximity to the charged area so that their longer dimensions are perpendicular to wall 14 and electrode 23. If the dielectric constant of the particles is smaller than that of the suspension medium, the particles would be oriented parallel to wall 14. The strength and direction of that field depends on the secondary electron emission property of the surface of wall 14, as well known in this art. The effect just described is illustrated in Fig. 5, where it is assumed that an electron charge 26 has just been formed on a limited area of the outside surface of glass wall 14. The light intercepting flaky or disc-like particles 24, for instance of shiny aluminum, outside the space affected by the field between charge 26 and electrode 23 remain oriented at random, whereas the particles 25 within that affected space are oriented essentially perpendicular to wall 14 and electrode 23.

Considering Fig. 5 in connection with Fig. 1, and assuming that visible light rays 27, 28 from source 16 are directed upon and pass the screen in the direction of the arrows shown, it should be clear that the light rays 28 passing the transparent wall 14 are intercepted by the particles 24 oriented at random and reflected backward through wall 14 in the direction of arrows 29, whereas the light rays 27 passing the portion of wall 14 on which charge 26 has just been formed and oriented the particles 25 essentially parallel to the direction of the light rays 27, are transmitted through the transparent suspension medium 15 between said particles, the transparent electrode 23 and the transparent front wall 12. Only a negligible part of the light rays 27 is intercepted and scattered or absorbed by the particles 25. Hence the portion of the light from source 16, Fig. 1, represented by light rays 28, Fig. 5, will be reflected and scattered backward into jacket 20, whereas the portion represented by light rays 27 is being transmitted to lens system 18 and projected upon screen 19. As a result, the areas of the suspension unaffected by charge 26 and comprising the particles 24, will be imaged on screen 19 as opaque areas, whereas the areas affected by an electron charge 26 will be projected or imaged upon screen 19 as light areas, the degree of brightness of which depends on the density of charge 26 and hence on the intensity of the impinging beam causing the formation of that charge.

The light rays 29 substantially reflected into jacket 20 heat the latter or cooling medium therein, without heating the suspension medium and parts of the tube confining it, as is the case with known suspension screens using light absorbing particles which are heated by the intercepted and absorbed light rays.

Referring to Fig. 3, there a cathode ray tube including a glass envelope 10, a neck 13, and, in this exemplification, a coil assembly 30 for electromagnetically focusing and deflecting the cathode ray beam, and particularly for causing it to scan (line and frame scan) the exposed surface of the screen, is arranged within a cabinet 31. Front wall 12 of the tube faces an opening 32 in the cabinet through which that wall and screen behind it can be seen by an observer 33. A loudspeaker 85 can be arranged behind another opening 34 of the cabinet.

In this case the light-valve suspension screen acts as a direct view screen. It comprises a thin electrode 23 transparent to light in conductive connection with a conductive coating 22 inside envelope 10 preferably at the same potential as or connected with the accelerating electrode or anode (not shown) of the tube. Preferably in contact with electrode 23, a container for a suspension is arranged, comprising a front and a rear wall 35, 36, for instance of thin sheets of mica which are transparent for visible light. The edges of walls 35, 36 of insulating and light transparent material are liquid-tightly connected by spacers 37 of any electrically insulating material. In the rear of wall 35 and slightly spaced therefrom by insulating spacers 38, a backing of metal foil 39 is arranged which is thin enough to permit electrons to pass without essential absorption, and also of great light reflecting or scattering power; it may consist for instance of shiny aluminum. The edges of the backing can be reinforced, e. g. by a frame or bars welded or soldered thereto and held in place by wires 54 held in or passing seals 55; one of the wires can be used for applying a desired potential (preferably lower than that of electrode 23) to backing 39. Hence the electron beam developed in neck 13 and modulated in its intensity according to electric signals representative of any intelligence to be visibly reproduced, will pass the light reflecting foil 39 and impinge upon the outside of wall 35, forming thereon locally electron charges of individual densities corresponding to the instantaneous intensity of the impinging beam; if the latter be substantially suppressed at any instant, no charge will be formed.

The particles suspended in the liquid medium 15 within container or cell 35, 36, 37, and which are normally oriented at random, will be oriented by the field produced between the charge formed on the outside of wall 35 and electrode 23, and the degree or extent of orientation depends on the density of that charge.

In this exemplification of the invention it is assumed that minute flaky light absorbing particles, such as graphite particles of colloidal size, are suspended in the transparent medium 15 forming a flat liquid layer. The operation of the screen will be better understood with reference to Fig. 6 in which a portion of the screen is shown on a greatly enlarged scale.

Rays 40 of diffuse day, room or artificial light incident through opening 32 upon the transparent front wall or window 12 in the direction of the affixed arrows, are transmitted through the light transparent electrode 23 and equally transparent wall or window 36 but are intercepted and absorbed by graphite particles 41 in screen portions not affected by electron charge 26 formed on the outside of transparent wall or window 35. Light rays 42, however, incident upon a screen portion within which the particles 43 are oriented by the charge 26, are transmitted between the oriented particles through transparent suspension 15, and wall 35 to the backing 39 of light highly reflecting or scattering property, which reflects or scatters substantially the incident light rays in the direction 44 through wall 35, suspension 15 (between the oriented particles 43), wall 36, electrode 23 and front wall 12 to the outside towards the observer 33. Accordingly the screen areas or portions in which light rays 40 are substantially absorbed by particles 41, oriented at random, will appear dark to the observer, whereas screen areas or portions hit by light rays 42 which are reflected as light rays 44, will appear light to him. Again the degree of brightness of the light spots depends on the density of charges 36 formed on wall 35 and therefore the instantaneous intensity of the beam depositing the charges, i. e. its modulation by the signals to be reproduced.

If instead of light essentially absorbing particles, light substantially reflecting ones are used according to one feature of the invention for a direct view suspension screen, a tube screen of the type described in Fig. 2 can be used and its wall 14 made light absorbing; to this end wall 14 of the container or cell may consist for instance of light absorbing insulating material such as glass or plastic, or a thin coating for instance of black lacquer can be applied on transparent wall 14 (preferably its inside).

A portion of such a screen is shown in Figs. 4a and 4b on greatly enlarged scale. In Fig. 4a it is assumed that the tube is not in operation and all the particles 24 are oriented at random. Substantially all light rays 45 transmitted through the transparent front wall 12 and electrode 23 are intercepted by particles 24 within the suspension medium 15 and substantially reflected or scattered outwardly in the general directions 46 towards an observer to whom therefore the entire screen appears light or whitish. However, if an electron charge 26 is locally formed by an impinging beam on the container wall 14 for instance of light absorbing material, Fig. 4b, the particles 25 in front of the charge are oriented essentially perpendicular or edge-wise to wall 14 and consequently light rays 47 incident upon this screen portion are transmitted through transparent wall 12, electrode 23, and suspension 15 to the light absorbing wall 14 where they are absorbed substantially. As a consequence, the screen portions not affected by local electron charges 26, appear light to the observer the same way as the entire screen in Fig. 4a whereas the screen portions affected by electron charges 26 appear more or less dark or black to him, depending on the density of the respective charge. If the suspended particles are light absorbing instead of light reflecting or scattering, the insulating wall 14 should be light reflecting or scattering, for instance by using for it white glass or applying to it a white coating, such as of magnesium oxide; in this case the effects described hereinbefore with reference to Figs. 4a, 4b will be reversed and the screen operate as described hereinbefore with reference to Fig. 6.

From the above it will be appreciated that with light absorbing suspended particles and a light reflecting backing, a "positive" reproduction is obtained and light areas appear where for instance the intensity of the impinging beam is strong, and vice versa. If however light scattering suspended particles are used in cooperation with a light absorbing backing, a "negative" reproduction is produced in that lighter areas appear in the screen where for instance the beam intensity is weaker, and vice versa. As well known in the art, in the first case a positive and in the second case a negative signal modulation upon the cathode ray beam has to be effected; the latter can be obtained for instance by reversing one stage in the signal amplifying set.

In the above described conversion, according to the invention, of a "suspension screen" into a direct-view screen by the use of a backing which is either of light absorbing property (if the suspended minute particles are light reflecting or scattering) or of light reflecting or scattering power (if the suspended particles be light absorbing), the impinging cathode ray beam representing the signals to be reproduced, produces a kind of fugitive pattern composed of a multitude of electron charges. The individual density of the latter depends on the instantaneous intensity of the beam, and this pattern is reproduced in the suspension by orienting the suspended particles locally and to an extent depending on the density of the respective charge. The orientation and thereby the reproduction in the suspension of that pattern can be caused to disappear within a predeterminable time period, for instance the frame scanning period, by dissipation or neutralization of the deposited or formed charges in well known or a new manner described hereinafter. By the use of light reflecting suspended particles, both a new type of light valve and direct view screen is obtained, exhibiting the advantage, among others, that light intercepted by the particles is reflected to great extent or almost entirely and only a smaller or negligible portion of the intercepted light is absorbed; strong sources of light to be projected through the valve or to be reflected by it for direct view purposes can thus be used without heating the particles by absorbed light energy to undesired or detrimental extent. The light rays intercepted by the suspended particles are either reflected into space where their heating energy is dissipated, or can be caught in suitably arranged and shaped heat absorbing bodies, such as cooling jackets provided with air cooling fins and/or passed by a cooling medium.

Fig. 7 shows the front portion of a cathode ray tube for direct view, for example in an arrangement according to Fig. 3, for color reproduction of the additive type, and particularly (though not exclusively) suited for color television receivers. Inside front wall 12 of the tube, a color filter screen 48 is applied which consists of groups of alternate sections or bands 49, 50, 51 parallel to picture lines. Assuming that the color picture is transmitted by three fundamental partial colors, for instance of suitable red, green and blue hue, each group of filter sections 49, 50, 51 will consist of a red, green and blue section. On the back of filter screen 48 a thin, transparent electrode 23, e. g. of sputtered metal is arranged, and in contact with it a suspension screen consisting for instance of a container comprising two light transparent walls of thin sheets of mica 35, 36 and spacers 37, the same as illustrated in Fig. 3. Assuming that light reflecting particles 24 are suspended in the medium 15 according to one feature of the invention, either wall 35 is black, e. g. of black glass, or a black coating 52 is applied to its inside, as exemplified in Fig. 7, consisting for instance of a black lacquer. The impinging beam will therefore deposit charges on wall 35 which orient the particles 24 in front of it. If instead of light reflecting particles 24, light absorbing particles 41 as explained hereinbefore with reference to Fig. 6, be suspended in the medium 15, Fig. 7, a light reflecting backing must be used instead of the light absorbing backing 52. In such case wall 35 is to consist of white material or to be coated on its inside with a white coating, or a thin metal sheet pervious to electrons and slightly spaced from wall 35 is to be arranged in a manner as illustrated for instance in Fig. 3 and the basic operation of which is explained herein with reference to Fig. 6.

In operation, a cathode ray beam upon which the signals to be reproduced are impressed, is swept over wall 35 and produces thereon a fugitive pattern of charges. With television transmission, the cathode-ray beam scans wall 35 in concurrence with the transmitter and in such a manner that during the red color field period only parts of the screen structure are scanned adjacent to the red filter sections 49, during the green color field period only parts adjacent to the green filter sections 50, and during the blue color field period only parts adjacent to the blue filter sections 51. Assuming a light reflecting backing 52 and light absorbing suspended particles 41, it should be clear that the incident day or room light passing wall 12 and the sections of filter 48 will be completely absorbed by particles 41 where no cathode-ray beam impinged the screen structure. Where, however, a charge has been deposited of a density depending upon the instantaneous intensity of the cathode-ray beam which in turn is controlled by the partial color values of the corresponding area at the transmitter, light of green, red or blue color passing the respective filter section 49, 50 or 51 will proceed between oriented particles to the reflecting backing 52 and be reflected to a greater or smaller degree through the color sections just undergoing scanning by the modulated beam, and the combined reflection of the proper light values for the three partial colors during a total frame scan comprised by the three color field scans described above, result in creating a proper additive color mixture for the observer.

Assuming that wall 35 is light absorbing or covered with a light absorbing medium 52, and the suspended particles are therefore light reflecting, incident light passing an elemental area of filter 48 will be reflected by the suspended particles 24 if no local orientation of the particles behind that area occured, i. e. the beam is of zero intensity, and the light reflected through all three filters over a certain area adds up to white. If particles behind one filter section of an area have been oriented, the light transmitted between them will be absorbed by the backing and no light reflected. If all the particles behind an area are oriented, all the light transmitted between those oriented particles is absorbed by the backing and the area appears black to the observer. In order to reproduce in such case the proper light and color values, the modulation of the cathode ray beam is to be reversed, for instance by reversing one stage of the picture signal amplifier. Assuming e. g. that a red area at the transmitter is to be reproduced, then the beam scanning the corresponding area of the suspension screen is to be of zero or minimum intensity when it scans the part of that area behind a red filter section, and of maximum intensity when it scans the parts of that area behind green and blue filter sections. Thereby suspended particles behind the green and blue filter sections will be oriented, permit the incident light to pass between them and to be absorbed by the black backing; suspended particles behind the red filter portion remain, however, oriented at random and reflect the incident light through the red filter section.

Other color systems in which e. g. the colors alternate in line or element frequency can of course be used. In all cases proper methods of scanning and modulation are to be applied which follow from the characteristics of the respective system used at the transmitter and do not form a subject matter of this invention.

If instead of a direct view screen, color reproduction is intended by means of a suspension light valve through which light from an extraneous source is to be projected upon a viewing screen, a color filter screen 48 comprising alternate filter sections 49, 50, 51 is arranged inside front wall 12, Fig. 8, and, if so desired, separated by a light transparent layer 53, such as a very thin sheet of mica, from the transparent electrode 23 in contact with container 35, 36, 37 of transparent dielectric material for the suspension 15, the same as hereinbefore described for instance with reference to Fig. 3. The latter may either contain suspended light absorbing or light reflecting minute particles, and of course proper positive or negative cathode ray beam modulations are to be applied.

In any case the light from the extraneous source passing an elemental area of the suspension and filter group 48 in front of it, will either add up to white, or another color or color combination, or be blacked out; in the first case (white) all the particles behind that area have been oriented so that the light can pass all three sections of the filter group comprised by that area, in the second case (other color than white) particles behind that area are partly oriented so that light can pass only sections of the filter group comprised by that color combination and in accordance with the relative beam intensities, whereas in the third case the particles of that area have not been oriented at all so that the light is screened entirely in that elemental area the projected image of which is therefore dark or black.

It will be appreciated that in the embodiments of the invention according to Figs. 3, 4a, 4b and 6, the incident light passes the suspension screen a second time upon reflection whereby picture contrasts are obtained between areas impinged by beam current of given difference, which are twice as large as obtainable with an embodiment according to Fig. 1.

As mentioned hereinbefore, de-orientation of the suspended particles can be produced in any known manner. The invention proposes for this purpose an arrangement shown rather schematically in Fig. 2, whereby supersonic waves are transmitted into the suspension liquid 15 perpendicularly to the walls 12 and 14 and so as to agitate and de-orient the suspended particles and extinguish; e. g., the picture reproduced by them. Plate 60 is cut from a quartz crystal in such a manner (X-cut) that a polar axis in the direction of which thickness vibrations can be excited is perpendicular to the face of wall or window 12 of tube 10 and therefore parallel to the plane of the drawing. Semi-transparent electrodes 61, 62 are associated with opposite surfaces of plate 60, for instance by sputtering thereon or depositing from the vapor phase a proper conductive material. Both electrodes can either cover the entire surface of plate 60 or only its portion near its edges; electrode 62 is shown by way of exemplification as covering only a part of plate 60. The latter with electrodes 61, 62 thereon is connected with the outside of wall 12, for instance, by means of a transparent cement.

Upon application of a high frequency potential of a frequency substantially equalling or forming a higher harmonic of the resonance frequency in which quartz crystal plate 60 can vibrate mechanically in the direction of its polar axis and thereby perform thickness vibrations within supersonic range perpendicular to wall 12, those thickness vibrations are excited and translated through wall 12 upon the suspension 15, and the supersonic waves progressing in the latter tend to orient the flat or plate-like particles within the suspension medium with their planes parallel to the supersonic wave fronts, i. e., parallel to wall 12. If therefore the suspended particles have been oriented by an electric field created by an impinging cathode ray beam with their planes or longer dimensions essentially perpendicular to wall 12, the supersonic waves will tend to re-orient them with their planes or longer dimensions parallel to that wall.

Assuming that the supersonic waves are continuously produced and transmitted into the suspension, they will become active and re-orient the suspended particles each time the orienting electric charges have disappeared. However, it is also possible to inject into suspension 15 those supersonic waves recurrently at certain time intervals, for instance between two frame scannings, although thereby some irregularity is introduced in the de-orientation in that lines scanned earlier in the frame remain active for a somewhat longer period than lines scanned nearer the end of the frame and therefore the moment of de-orientation.

In the case of television, the frequency at which plate 60 is excited and therefore the frequency of the mechanical waves translated upon suspension 15 should preferably be a multiple of the line frequency. Assuming, e. g., 525 lines per picture and 30 picture frames per second, the so-called line frequency is 15,750; assuming further that the frequency at which plate 60 is excited amounts to 50 times the line frequency or 787,500, a plate 60 of approximately 3.68 millimeter thickness would exhibit this resonance frequency for its thickness vibrations, and the exciting frequency put on plate 60 by means of electrodes 61, 62, conductors 63, transformer 64, conductors 65 and source of high frequency 66 (for instance a tube generator of the Hartley circuit type) should equal or be a harmonic of that frequency. If a Hartley oscillator is used, it can be locked to the line frequency scanner, i. e., the synchronizing signals, by means of a multiplier circuit. For instance, by multiplication of the line frequency by 7×7, the oscillator frequency would amount to 49 times the line frequency corresponding to 771,750 cycles per second, and a crystal plate thickness of about 3.7 millimeters would be required.

If this feature of the invention be used, electrode 61 can substitute for electrode 23 and the latter therefore be omitted. In such case one conductor 63 connected with electrode 61, can be connected by line 67 (indicated in dotted lines) with the potential on which coating 22 or an accelerating anode of tube 10 is held. Furthermore, in such case, front wall or window 12 can be replaced by quartz plate 60, and the latter cemented or sealed into a corresponding opening in the front of tube 10. As another alternative, Fig. 9, plate 60 with electrodes 61, 62, spacer 37 and wall or target 35, e. g. of mica, can form a unit and thereby cell for the suspension 15, and this cell sealed at 70 to the remaining portion of the tube 10, as per se known in the art. Transparent electrode 61 has in this case also the function of electrode 23, Figs. 2, 3, etc., and one of the conductors 63 (of same purpose as explained with reference to Fig. 2) connected with electrode 61, is connected with the secondary of transformer 64 and through conductor 67 with the positive terminal of source 69 of high voltage which is also connected, e. g., through conductor 68 with coating 22 (or an accelerating anode) while the negative terminal of that source is connected with the cathode of the electron gun in tube neck 13.

It should be understood that this embodiment of the invention can be used for a light valve, as illustrated in Figs. 2 and 8, or for a direct view screen; in the latter case a light absorbing backing (if the suspended particles be light reflecting or scattering) or a light reflecting backing (if the suspended particles be light absorbing) is to be used for the cell, as illustrated, e. g., at 39 in Fig. 3 and 52 in Fig. 7, and explained with reference to Figs. 4 through 6.

It should be understood that the invention is not limited to any exemplification hereinbefore described but is to be derived in its broadest aspects from the appended claims.

What I claim is:

1. In apparatus for visibly reproducing electric signals representative of intelligence, a flat container comprising two slightly spaced walls, at least one of said walls of insulating dielectric material, at least one of said walls transparent for visible light, a suspension within said container including a transparent suspension medium and minute substantially flat particles capable of intercepting light, said particles of high optical light reflecting or scattering power, said suspended particles under one condition of operation directed at random and under another condition being oriented, one of said conditions being brought about by electric charges deposited on said insulating wall, said insulating wall exposed to a cathode-ray beam, means for developing and directing a cathode-ray beam controlled by electric signals to be reproduced upon selected areas of said insulating wall so as to form thereon said electric charges, a mechanical vibrator element electrically excitable to supersonic thickness vibrations associated and substantially co-extensive with one of said walls, said element substantially transparent for visible light and exemplified by a quartz plate, and electrical means associated with said element so as to excite it to supersonic vibrations which are translated upon said associated wall and suspension and thereby bring about the other one of said conditions.

2. In apparatus for visibly reproducing electric signals representative of intelligence, a flat container comprising two slightly spaced walls at least one of which is substantially transparent for visible light, one of said walls of insulating dielectric material and exposed on its outside to a cathode ray beam, the other one of said walls substantially transparent for visible light and substantially formed by a thin plate capable of being excited to supersonic thickness vibrations, a suspension within said container including a transparent suspension medium and minute substantially flat particles capable of intercepting light, said suspended particles under one condition of operation directed at random and under another condition being oriented, one of said conditions being brought about by electric charges deposited on said insulating wall, means for applying a fixed positive potential to one side of said suspension, means for developing and directing a cathode-ray beam controlled by electric signals to be reproduced upon selected areas of said insulating wall so as to form thereon said electric charges, and electrical means associated with said plate for exciting it to supersonic thickness vibrations which are translated upon said suspension for bringing about the other one of said conditions.

3. In an apparatus as set forth in claim 1, a source of high frequency current in circuit with said electrical means for exciting said vibrator.

4. In an apparatus as set forth in claim 1, for television reception, a source of high frequency current in circuit with said electrical means for exciting said vibrator at a supersonic frequency equalling a multiple of the line frequency.

5. In an apparatus as set forth in claim 1, for television reception, a source of high frequency current in circuit with said electrical means for exciting said vibrator recurrently at frame scanning frequency to supersonic vibrations.

6. In an apparatus as set forth in claim 2, a source of high frequency current in circuit with said electrical means for exciting said vibrator.

7. In apparatus for visibly reproducing electric signals representative of intelligence, an evacuated envelope, a container sealed into said envelope so as to form a front portion thereof, said container comprised of two slightly spaced walls, one of said walls facing the interior of said envelope of insulating dielectric material, the opposite wall comprised of a unit substantially transparent for visible light and substantially comprising a quartz plate, a thin, substantially transparent metallic layer on the inside of said plate and a substantially light transparent metallic electrode covering at least a part of the outside of said plate, a suspension within said container including a transparent suspension medium and minute substantially flat particles capable of intercepting visible light, and of high optical light reflecting or scattering power, said suspended particles under one condition of operation directed at random and under another condition being oriented, means for developing a cathode-ray beam within said envelope and for directing it upon selected areas of said insulating wall of the container so as to form thereon electric charges capable of bringing about one of said conditions, and electrical means connected with said metallic layer and said electrode for applying to said plate supersonic electric oscillations and thereby excite it to thickness vibrations within supersonic frequency range which are translated upon said suspension contacting said metallic layer and can bring about the other one of said conditions.

ADOLPH H. ROSENTHAL.

REFERENCES CITED

The following references are of record in the file of this patent:

UNITED STATES PATENTS

| Number | Name | Date |
|---|---|---|
| 2,128,631 | Eaton | Aug. 30, 1938 |
| 2,267,251 | Okolicsanyi | Dec. 23, 1941 |
| 2,277,008 | Ardenne | Mar. 17, 1942 |
| 2,281,637 | Sukumlyn | May 5, 1942 |
| 2,290,581 | Donal, Jr. | July 21, 1942 |
| 2,290,582 | Donal, Jr. | July 21, 1942 |
| 2,292,555 | Wesch | Aug. 11, 1942 |
| 2,296,908 | Crosby | Sept. 29, 1942 |
| 2,335,659 | Fraenckel et al. | Nov. 30, 1943 |

FOREIGN PATENTS

| Number | Country | Date |
|---|---|---|
| 48,053 | France | Oct. 18, 1937 |